July 26, 1966  R. J. KLEIN  3,263,157
REGULATOR CIRCUIT

Filed April 17, 1962  6 Sheets-Sheet 1

Fig. 1

VOLTS

TIME

Fig. 2

INVENTOR.
RICHARD J. KLEIN
BY Woodling, Krost,
Granger and Rust,
ATTORNEYS

July 26, 1966   R. J. KLEIN   3,263,157
REGULATOR CIRCUIT
Filed April 17, 1962   6 Sheets-Sheet 2

INVENTOR.
RICHARD J. KLEIN
BY Woodling, Krost,
Granger and Rust,
ATTORNEYS

July 26, 1966  R. J. KLEIN  3,263,157
REGULATOR CIRCUIT

Filed April 17, 1962  6 Sheets-Sheet 3

INVENTOR.
RICHARD J. KLEIN
BY Woodling, Krost,
Granger and Rust
ATTORNEYS

Fig. 8

INVENTOR.
RICHARD J. KLEIN
BY Woodling, Krost,
Granger and Rust,
ATTORNEYS

Fig. 9

INVENTOR.
RICHARD J. KLEIN
BY Woodling, Krost,
Granger and Rust,
ATTORNEYS

Fig. 10

United States Patent Office 3,263,157
Patented July 26, 1966

3,263,157
REGULATOR CIRCUIT
Richard J. Klein, Caneadea, N.Y., assignor to Acme Electric Corporation, Cuba, N.Y., a corporation of New York
Filed Apr. 17, 1962, Ser. No. 188,041
9 Claims. (Cl. 323—22)

The invention relates in general to a regulator circuit operable from a periodically varying voltage such as alternating voltage and, more particularly, to a voltage regulator operating from first and second different voltages through controlled rectifiers to obtain a regulated output voltage.

The invention may be incorporated in a regulator for operation of a load from alternating voltage source means from which is derived first and second voltages of different magnitude, means is provided to connect the first voltage to the source means and to a load and means including a controlled rectifier is provided to connect the second voltage to the source means and to the load, control circuit means is provided to establish energization of the load from the first voltage and essentially at the start of one half cycle of this first voltage, and means is provided to control the control circuit means to establish conduction of the rectifier part way through the said one half cycle to change the effective voltage supplied to the load.

Various A.C. regulators have been provided in the past with various defects that they are either load sensitive or frequency sensitive or are noisy in operation or have poor power factor or efficiency or have poor wave form with large harmonic contents or have poor response time due to magnetic circuits within the system.

An object of the present invention is to obviate the above disadvantages in a regulator circuit.

Another object of the invention is to provide an A.C. regulator to a load which has a good power factor by elimination of any inductive reactance in series with the load.

Another object of the invention is to provide a regulator circuit operable with any type of load regardless of power factor.

Another object of the invention is to provide a regulator circuit having high efficiency and one wherein the regulated output wave form is close to sinusoidal with low harmonic content.

Another object of the invention is to provide a regulator circuit with electronic control of steps of voltage which may be made an infinite control within the range of the regulator.

Another object of the invention is to provide a regulator circuit which is operable on a wide range of frequencies.

Another object of the invention is to provide a regulator circuit which may be readily controlled by feedback in accordance with a load condition or controlled by a condition of the input voltage or a combination of both.

Another object of the invention is to provide a regulator circuit utilizing solid state controlled rectifiers and one wherein the response time to disturbances is very short.

Another object of the invention is to provide a regulator circuit which is small and light for compactness and one wherein the noise level is quite low.

Another object of the invention is to provide a regulator circuit with solid state controlled rectifiers acting essentially as infinitely variable tap changing devices.

Other objects and a fuller understanding of the invention may be had by referring to the following description and claims, taken in conjunction with the accompanying drawings, in which:

Figure 1:
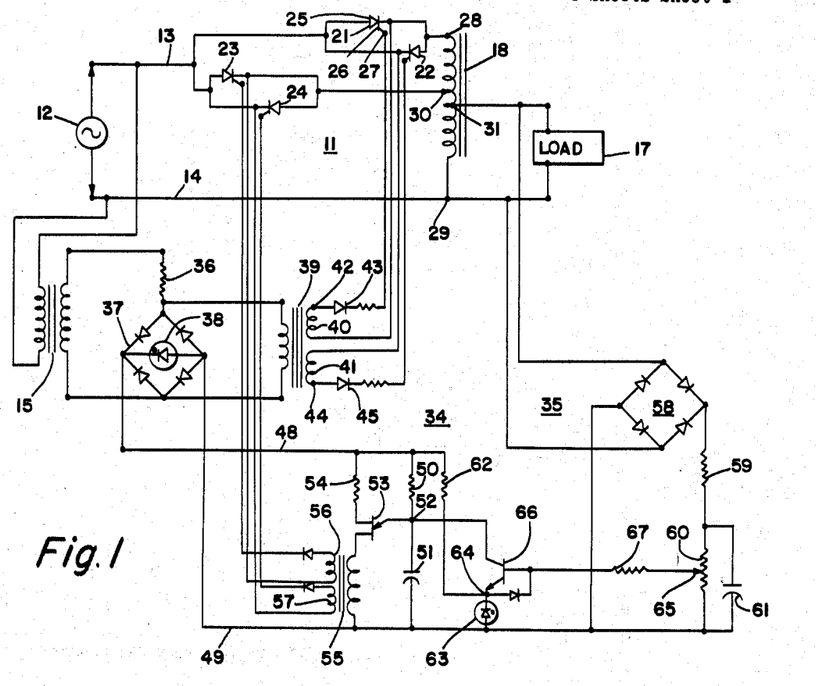
FIGURE 1 is a schematic diagram of a simple circuit incorporating the invention.

FIGURE 1 shows schematically a simple circuit incorporating the invention and illustrates the fundamental principle of the invention. FIGURE 1 shows a regulator circuit 11 which is operable from a variable voltage source shown as an alternating current source 12. This source supplies lines 13 and 14 across which a power supply transformer 15 is connected. A load 17 is supplied from the A.C. source 12 through an auto transformer 18. The load 17 is also supplied from the A.C. source through first, second, third and fourth controlled rectifiers 21 to 24, respectively. These controlled rectifiers are illustrated as solid state controlled rectifiers such as silicon controlled rectifiers and the first controlled rectifier 21 is illustrated as having an anode 25, a cathode 26 and a gate 27. The other controlled rectifiers also have such three elements, unnumbered. The auto transformer 18 is shown as having a first terminal 28, a second terminal 29 and a tap terminal 30.

The first and second controlled rectifiers 21 and 22 are connected in opposition and in parallel between the line 13 and the transformer first terminal 28. The third and fourth controlled rectifiers 23 and 24 are connected in opposition and in parallel between the line 13 and the tap terminal 30. The second terminal 29 of the auto transformer is connected to the line 14. The load is connected in some manner to the auto transformer 18 and as shown is connected to terminal 29 and to a tap 31.

The regulator circuit 11 includes generally a control circuit 34 which, in turn, includes a feedback circuit 35. The control circuit 34 may be connected for energization from the power supply transformer 15. This transformer supplies a resistor 36 and a rectifier bridge 37 having a zener diode 38 connected across its output. A third transformer 39 has its primary connected across the rectifier bridge 37 and has secondaries 40 and 41. Terminal 42 of secondary 40 supplies a firing signal to the gate 27 of the first controlled rectifier 21 through a diode 43 which assures only unidirectional current to this gate. Similarly, on opposite half cycles of the input voltage, terminal 44 of the transformer secondary 41 supplies a firing signal to the gate of the second controlled rectifier 22 through a diode 45 which again assures only unidirectional current to this gate.

The rectified output of the bridge 37 is supplied on a positive line 48 and a negative line 49. An RC combination of resistor 50 and capacitor 51 is connected across lines 48 and 49 and the junction 52 therebetween supplies a voltage signal to the emitter of a unijunction transistor 53. The bases of the unijunction transistor 53 are connected between lines 48 and 49 by a resistor 54 and a pulse transformer 55. The transformer 55 has secondaries 56 and 57 supplying unidirectional firing signals to the gates of the third and fourth controlled rectifiers 23 and 24, respectively.

The charging voltage on the capacitor 51 determines the turn-on point of the unijunction transistor 53 and, accordingly, the time in the particular half cycle at which a firing pulse is delivered by the pulse transformer 55 to the respective controlled rectifier 23 and 24. This turn-on point may be controlled in a number of ways and, as illustrated in FIGURE 1, it is controlled by the feedback circuit 35. This feedback circuit 35 includes a rectifier bridge 58 energized from the load 17 and supplying a rectified output to a resistor 59 and potentiometer 60. A filter capacitor 61 is connected across the potentiometer 60. A reference voltage is obtained in any suitable manner and in FIGURE 1 is illustrated as being obtained by connecting a resistor 62 and a zener diode 63 across the lines 48 and 49. Thus, a reference voltage appears across the zener diode 63 at terminal 64. The feedback circuit 35 compares the reference voltage at terminal 64 with a feedback voltage dependent upon a load condition as determined by the voltage at potentiometer slider 65. This comparison of potentials at terminals 64 and 65 is supplied to a transistor 66 with slider 65 connected to the base of the transistor 66 through a limiting resistor 67 and the emitter of the transistor 66 connected to terminal 64. This transistor 66 is shown as an NPN type and the collector of transistor 66 is connected to a suitable voltage source such as terminal 52.

*Operation*

The regulator circuit 11 regulates the output voltage to the load 17 in accordance with a load condition, in this case load voltage. Accordingly, if the load current increases because of a change in the load, the feedback circuit 35 senses this change to control the control circuit 34 and establish a change in conduction in the controlled rectifiers 21 to 24 to restore the load voltage to the desired value. Additionally, if the input voltage 12 changes, this will provide a corresponding change in the load voltage 17 which is again corrected by the feedback circuit 35 and control circuit 34 to return to the desired value.

The regulator circuit 11 may be considered as an electronically controlled tap changing device in conjunction with the auto transformer 18. The graph of FIGURE 2 helps explain the operation. Curve 70 is a curve of the input voltage from the source 12. If the line 13 were directly connected to the first terminal 28 of the auto transformer 18, this would be a first voltage between terminals 28 and 29 and, because of the transformation ratio of the transformer, a first low output voltage 71 would be supplied to the load 17. Alternatively, if the input line 13 were directly connected to the transformer tap 30, this would be a second voltage between terminals 29 and 30 and, because of the larger output transformation ratio, there would be a second larger output voltage 72 supplied to the load 17.

If the controlled rectifiers 21 and 22 are controlled to be fired essentially at the start of the respective half cycle of voltage with rectifiers 21 and 22 conducting alternately on the positive and negative half cycles, respectively, then the voltage applied to the load would be the lower output voltage 71. If the third and fourth controlled rectifiers 24 were controlled to be fired essentially at the start of the positive and negative half wave voltages, respectively, then the input line 13 would effectively be connected to the transformer tap 30 and, thus, the larger output voltage 72 would be supplied to the load 17. The above describes a two-step or tap changing system which is electronically controlled as to tap changing. Additionally, the regulator circuit 11 provides a system wherein the output voltage may be controlled, not only in two steps of voltage, but through an infinitely variable range between these two voltages 71 and 72, as far as the effective R.M.S. voltage is concerned. The regulator circuit 11 establishes that the first and second controlled rectifiers 21 and 22 are fired essentially at the start of the respective positive and negative half cycles of input voltage and then at some controlled point throughout each half cycle, the third and fourth rectifiers 23 and 24 are fired.

Figure 2:
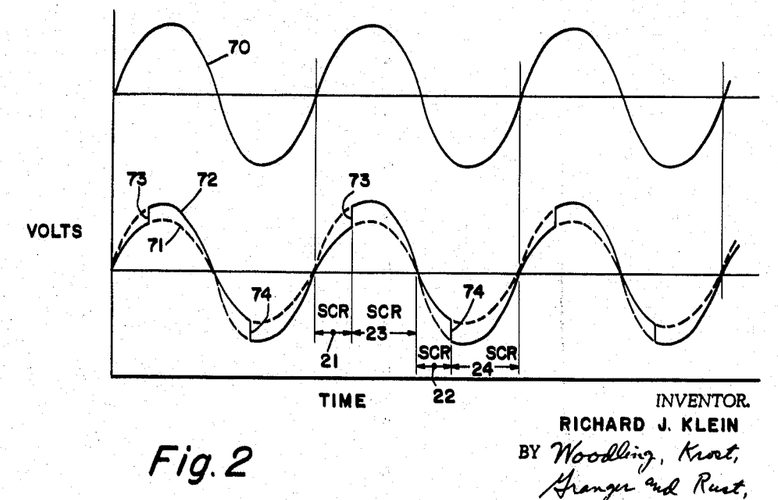
FIGURE 2 is a graph of voltages obtained from the circuit of FIGURE 1.

FIGURE 2 shows a point 73 at which the changeover is made between the first voltage 71 and the second voltage 72. At this point 73, which is shown at about the 70 degree point in the cycle by way of example, the third controlled rectifier 23 is fired, whereas previously the first controlled rectifier 21 had been conducting. When the third controlled rectifier 23 fires, assuming line 13 is positive to line 14, the rectifier 23 presents substantially a short circuit between terminal 30 and line 13, except for the low forward voltage drop of this rectifier 23. This places the potential of terminal 30 on the anode 25 of the controlled rectifier 21. Since the potential of terminal 30 is more negative than the potential of terminal 28, this rapidly extinguishes the first controlled rectifier 21, in the order of one or two microseconds. Then, for the remainder of the positive half cycle, the third controlled rectifier 23 conducts and, accordingly, the effective load voltage is increased. When the input voltage goes negative, the third controlled rectifier 23 is extinguished by reversal of applied voltage thereto. At this time, at the start of the negative half cycle, the second controlled rectifier 22 is triggered by the appropriate signal to the gate thereof to be fired. Thus, for the first part of the negative half cycle, the terminal 28 is effectively connected to the line 13. At a controlled point 74 in the negative half cycle, the gate of the fourth controlled rectifier 24 is triggered and, accordingly, the fourth controlled rectifier 24 will conduct. Upon conduction, this again effectively places a short circuit between terminal 30 and line 13 and, since the potential of terminal 30 is positive relative to the potential of terminal 28 at that instant, this positive potential will be applied to the cathode of controlled rectifier 22 to extinguish conduction therethrough.

The control circuit 34 may have any suitable means for establishing conduction of the first and second controlled rectifiers 21 and 22 essentially at the start of the positive and negative half cycles, respectively. The circuit of FIGURE 1 shows a possible circuit configuration. The alternating voltage supplied by the transformer 15 to the combintaion of the resistor 36 and bridge rectifier 37 will establish a clipped sine wave or squared off wave across the input terminals of the bridge rectifier 37 because of the zener diode 38 across the output terminals of this bridge 37. This zener diode may have a low breakdown voltage of only, for example, three to ten volts. This is supplied through the third transformer 39 to the gates of the controlled rectifiers 21 and 22. Since the steeply rising wave front of the squared wave is in synchronism with the A.C. input voltage, the controlled rectifiers 21 and 22 are triggered to fire essentially at the start of the respective positive and negative half cycles.

The feedback circuit 35 provides a convenient means for control of the regulator circuit 11. The control circuit 34 is supplied by a unidirectional clipped voltage wave on lines 48 and 49 from the bridge rectifier 37 and zener diode 38. This unidirectional current attempts to charge the capacitor 51 through the resistor 50. When the voltage across the capacitor 51 reaches the proper firing voltage, then the unijunction transistor 53 will turn on. Upon turning on, an amplified current is delivered through the two bases of the unijunction transistor from line 48 to 49 through resistor 54 and the primary of the pulse transformer 55. Thus, this supplies a triggering signal to fire the respective third or fourth controlled rectifier 23 or 24. The time at each half cycle that it takes to charge the capacitor 51 to the point where the unijunction transistor 53 turns on, determines the phase angle of the points 73 and 74 in the voltage curves of FIGURE 2, whereat the third or fourth controlled rectifier 23 or 24 is fired. The transistor 66 controls the charging rate on the capacitor 51 since the collector and emitter thereof are connected in circuit across this capacitor 51. If the transistor 66 is conducting, this effectively clamps terminal 52 to the potential of terminal 64, which is a reference voltage terminal, and thus the unijunction transistor 53 will thus not turn on and thus the third and fourth controlled rectifiers 23 and 24 will not fire. This could be the condition with maximum input voltage or minimum load. If now the input voltage drops or the load current increases, in either event lowering the load voltage, then the feedback circuit 35 establishes that the third and fourth controlled rectifiers 23 and 24 will be turned on for a part of the cycle to increase the load voltage in accordance with the higher output voltage 72. Previously, a certain load voltage established a high positive potential at the potentiometer slider 65 to maintain transistor 66 in full conduction. Now with a decreased load voltage, the positive potential at slider 65 decreases, decreasing the current through transistor 66, thus allowing the voltage across capacitor 51 to increase to a point whereat unijunction transistor 53 is turned on late in the respective half cycle to trigger the respective controlled rectifiers 23 and 24. For very large load currents or very low input voltages and consequent tendency of the load voltage to decrease, the positive potential of slider 65 decreases to a point whereat the transistor 66 is practically cut off and, accordingly, capacitor 51 is charged early in the cycle to the point whereat the unijunction transistor 53 turns on and controlled rectifiers 23 and 24 are fired early in the cycle, thus supplying the higher output voltage 72 to the load for essentially the entire respective half cycle. Accordingly, it will be noted that the regulator circuit 11 supplies an infinitely variable range of effective R.M.S. voltage to the load 17 between the two output voltages determined by the voltages available at the taps 28 and 30 of the auto transformer 18.

Figure 3:
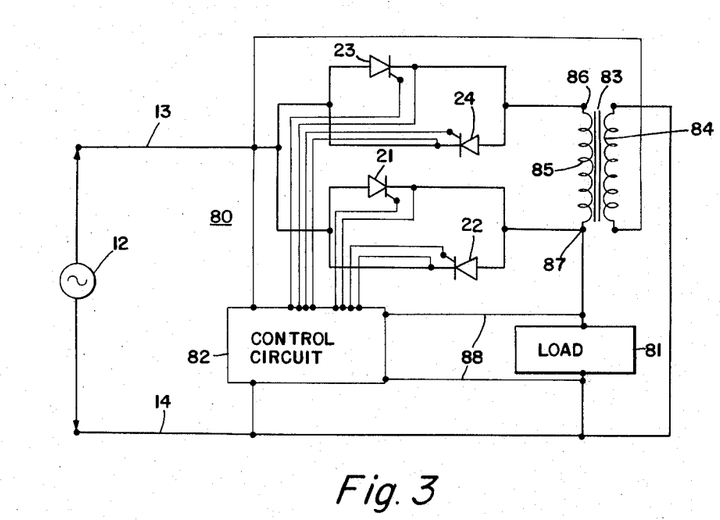
FIGURE 3 is a schematic diagram of a modified circuit.

FIGURE 3 shows a modified regulator circuit 80 utilizing the first through fourth controlled rectifiers 21 to 24, respectively, to control current supplied to a load 81. A control circuit 82 may be similar to the control circuit 34 of FIGURE 1 for control of the firing of the controlled rectifiers 21 to 24. A transformer 83 has a primary 84 reversely connected across the lines 13 and 14 and has a secondary 85 with terminals 86 and 87. The pair of opposedly connected rectifiers 21 and 22 are connected in parallel between line 13 and terminal 87 and the pair of opposedly connected rectifiers 23 and 24 are connected in parallel between line 13 and terminal 86. Feedback lines 88 from the load 81 may be connected to the control circuit 82.

The operation of FIGURE 3 is similar to the operation of FIGURE 1 and the voltages of FIGURE 2 also apply. The first and second controlled rectifiers 21 and 22 are controlled in their firing by control circuit 82 to be fired essentially at the start of the respective positive and negative half cycles of input voltage. At a controlled firing angle partway through each positive and negative half cycle, the respective rectifier 23 or 24 is fired. Because of the cross connection of the transformer 83, when line 13 is positive relative to line 14, then terminal 87 is positive relative to terminal 86. Thus, with the first rectifier 21 triggered to fire at the start of the positive half cycle, then when the third rectifier 23 is fired partway through that same half cycle, the effective short circuit of rectifier 23 places the more negative potential of terminal 86 on the anode of rectifier 21 to extinguish this rectifier. Accordingly, the third rectifier 23 conducts for the remainder of the positive half cycle. On the negative half cycle, the second rectifier 22 conducts for the first part of this half cycle and then when the fourth rectifier 24 is fired, this extinguishes rectifier 22. The control circuit 82 may derive power for operation thereof either from the input lines 13 and 14 or from the feedback lines 88 and may control the regulator circuit 80 either in accordance with fluctuations in input voltage or fluctuations in load voltage or a combination of both, as in the circuit of FIGURE 1.

Figure 4:
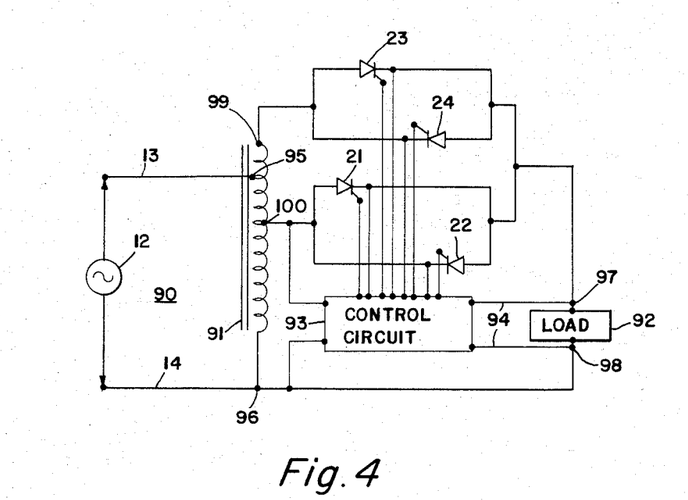
FIGURE 4 is a schematic diagram of another modification.

FIGURE 4 shows a second modification of a regulator circuit 90 again utilizing the four controlled rectifiers 21–24. In this case the rectifiers 21–24 are placed in the output circuit of an auto transformer 91 supplying a load 92 through these rectifiers 21–24. A control circuit 93 is used and may be similar to the control circuit 34 of FIGURE 1. Feedback lines 94 may be connected from the load 92 to the control circuit 93. The A.C. source 12 supplies lines 13 and 14 which may be connected in any suitable manner to the auto transformer 91 and, as shown, are connected to terminals 95 and 96 of this auto transformer. The load has terminals 97 and 98 with terminal 98 connected to the line 14 at transformer tap 96. Terminal 97 of the load is connected to a high voltage terminal 99 of the auto transformer 91 through the paralleled third and fourth rectifiers 23 and 24. This terminal 97 of the load is also connected to a lower voltage transformer terminal 100 through the paralleled first and second rectifiers 21 and 22.

The control circuit 93 again may establish firing of the first and second controlled rectifiers 21 and 22 essentially at the start of the respective positive and negative half cycles. This supplies a first low voltage 71 to the load. At a controlled phase angle, the third and fourth controlled rectifiers 23 and 24 are fired on the respective positive and negative half cycles to change to a higher output voltage supplied to the load. Again, change of the phase of the firing point on rectifiers 23 and 24 changes the effective R.M.S. value of the voltage supplied to the load 92. This load voltage again may be controlled in accordance with input voltage or a load condition or a combination of both.

Figure 5:
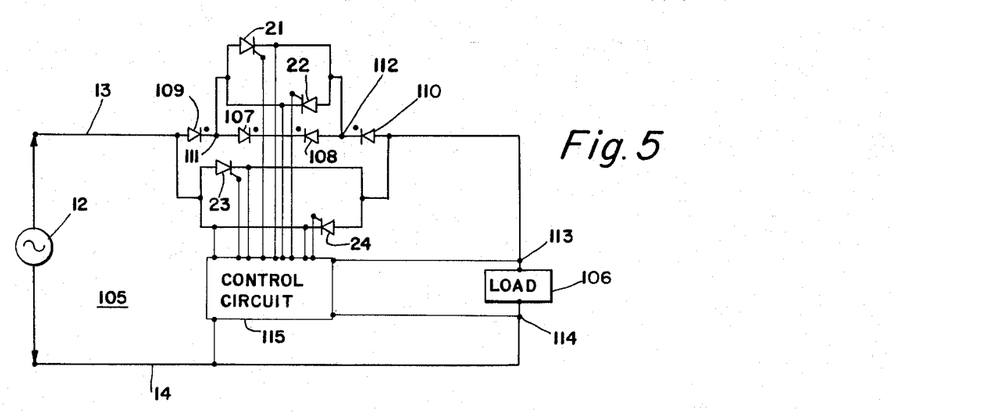
FIGURE 5 is a schematic diagram of a third modification.

FIGURE 5 shows a third modification embodied in a regulator circuit 105. A load 106 is energized from the A.C. source 12, in this case in three different steps of voltage. The first through fourth controlled rectifiers 21–24 are again used in opposedly connected pairs. Additionally, four zener diodes 107 to 110 are used. Zener diodes 107 and 108 are connected in series in opposition between terminals 111 and 112. Zener diodes 109 and 110 are connected in series opposition and with zener diodes 109 connected between line 13 and terminal 111 and zener diode 110 connected between terminal 112 and a terminal 113 of the load 106. Terminal 114 of the load is connected to line 14. A control circuit 115 is used to control the firing of the controlled rectifiers 21–24 and may be similar in most respects to the control circuit 34 of FIGURE 1.

Figure 6:
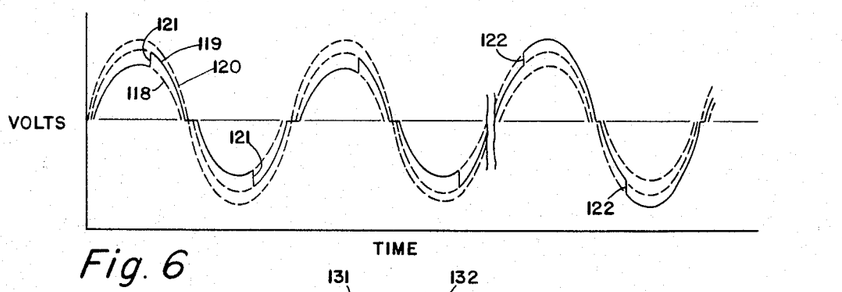
FIGURE 6 is a graph of voltage wave forms obtainable from the circuit of FIGURE 5.

The regulator circuit 105 has a three-step regulating function. Assume that the zener diodes 107–110 have a forward voltage drop of about one volt and a backward voltage drop of about nine volts, then the pair 107 and 108 have about a ten volt drop for each direction of the alternating current. Similarly, the pair of zener diodes 109 and 110 may be assumed to have a ten volt drop for each of the two directions of current flow. Accordingly, if the load 106 is energized through the four zener diodes 107–110, then the load voltage will be approximately twenty volts less than the line voltage. This is the first step of voltage regulation. If now the first and second controlled rectifiers 21 and 22 are fired at a controlled point in phase angle, this will effectively short out the first pair of zener diodes 107 and 108 for the remainder of both the positive and negative half cycles. Accordingly, the load voltage is raised approximately ten volts during the last portion of the half cycles when controlled rectifiers 21 and 22 are firing. This is the second step of voltage regulation. If now the third controlled rectifiers 23 and 24 are alternately fired, this shorts out the second pair of zener diodes 109 and 110 and places essentially full line voltage on the load 106. This is the third step of voltage regulation. FIGURE 6 is a graph of voltages obtained by the regulator circuit 105 and shows a first voltage 118 obtained when the load 106 is energized through the four zener diodes 107–110. A second higher voltage 119 is applied to the load 106 through the controlled rectifiers 21 and 22. A third and still higher voltage 120 is supplied to the load 106 through the controlled rectifiers 23 and 24. The first portion of FIGURE 6 shows a point 121, for example, at which the changeover is made from the first voltage 118 to the second voltage 119 for both positive and negative half cycles by the controlled firing of the rectifiers 21 and 22. If the control circuit 115 calls for still higher voltage, as determined by either lower input voltage or greater load current or both, then the control circuit 115 may shift to a selective firing of the third and fourth controlled rectifiers 23 and 24 at a point 122, for example, to change between the second and third voltages 119 and 120 and thus raise the effective R.M.S. voltage on the load 106. The firing of the third and fourth rectifiers 23 and 24 may be at a controlled point as determined by a control circuit similar to the control circuit 34 of FIGURE 1. Additionally, the first and second controlled rectifiers 21 and 22 may be controlled in firing angle by a circuit similar to the control circuit 34 of FIGURE 1 and with the first and second rectifiers 21 and 22 firing first and the third and fourth rectifiers 23 and 24 initially biased off until a predetermined level has been reached, as in the circuit of FIGURE 8, below. It will be noted that the voltage waves 118 to 120 of FIGURE 6 do not all have the same cross-over point at the axis as do the two voltage waves 71 and 72 of FIGURE 2. This is because of the constant voltage drop across the zener diodes 107 to 110.

Figure 7:
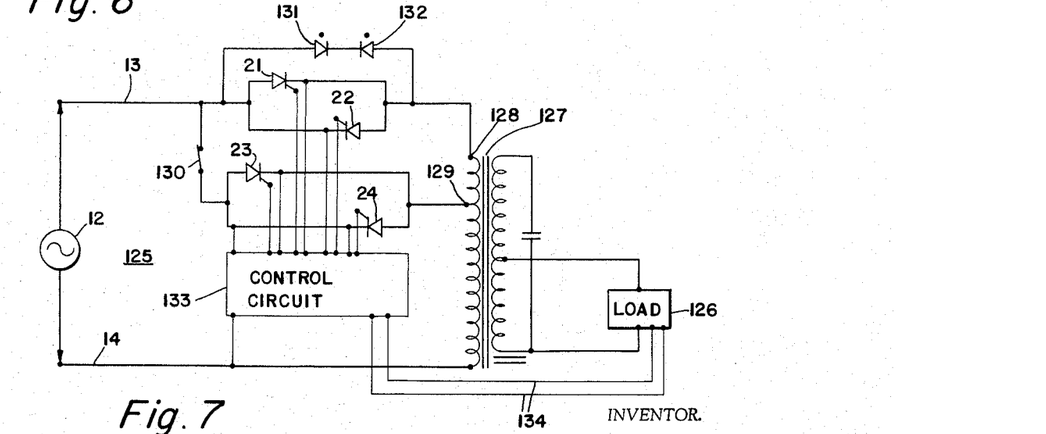
FIGURE 7 is a schematic diagram of a fourth modification.

FIGURE 7 shows a further modification of the invention as embodied in a regulator circuit 125. This regulator circuit 125 supplies energization to a load 126 from the A.C. source 12 through a transformer 127 which may be a constant voltage transformer. The primary of the transformer 127 has a terminal 128 connected to the line 13 through the paralleled opposed rectifiers 21 and 22. A tap terminal 129 on this primary is connected to the line 13 through the paralleled opposed rectifiers 23 and 24 and through a switch 130. The terminal 128 is also connected to line 13 through series connected zener diodes 131 and 132 connected in opposition. A control circuit 133 controls the regulator circuit 125 and feedback lines 134 may be used from the load 126 to the control circuit 133.

The circuit of FIGURE 7 operates similarly to the operation of the circuit of FIGURE 5. If the transformer 127 is energized through the zener diodes 131 and 132, it is supplied with a lower voltage at the terminal 128 for a first low voltage 118 supplied to the load 126, see FIGURE 6. If the controlled rectifiers 21 and 22 are conducting, this supplies the line voltage directly to terminal 128 and a second higher voltage 119 is supplied to the load 126. If the switch 130 is open, this makes the regulator circuit 125 only a two-step regulator using only two controlled rectifiers 21 and 22. If the switch 130 is closed, this makes the controlled rectifiers 23 and 24 available in the circuit and, when these rectifiers are conducting, this supplies the voltage of line 13 to the tap 129, thus increasing the transformation ratio and supplying a third and highest voltage 120 to the load 126. Again, as in previous circuits, the phase angle of the firing point of the controlled rectifiers may be varied to provide an infinite control of the output voltage in a range between the first and third voltages 118 and 120. Additionally, this control circuit 133 may control the load voltage in accordance with the load condition or despite variations in input voltage or a combination of both. This regulator circuit 125, when supplying a transformer which is a constant voltage transformer, as shown, helps keep this constant voltage transformer within its regulating range even though the input voltage may vary outside this range.

Figure 8:
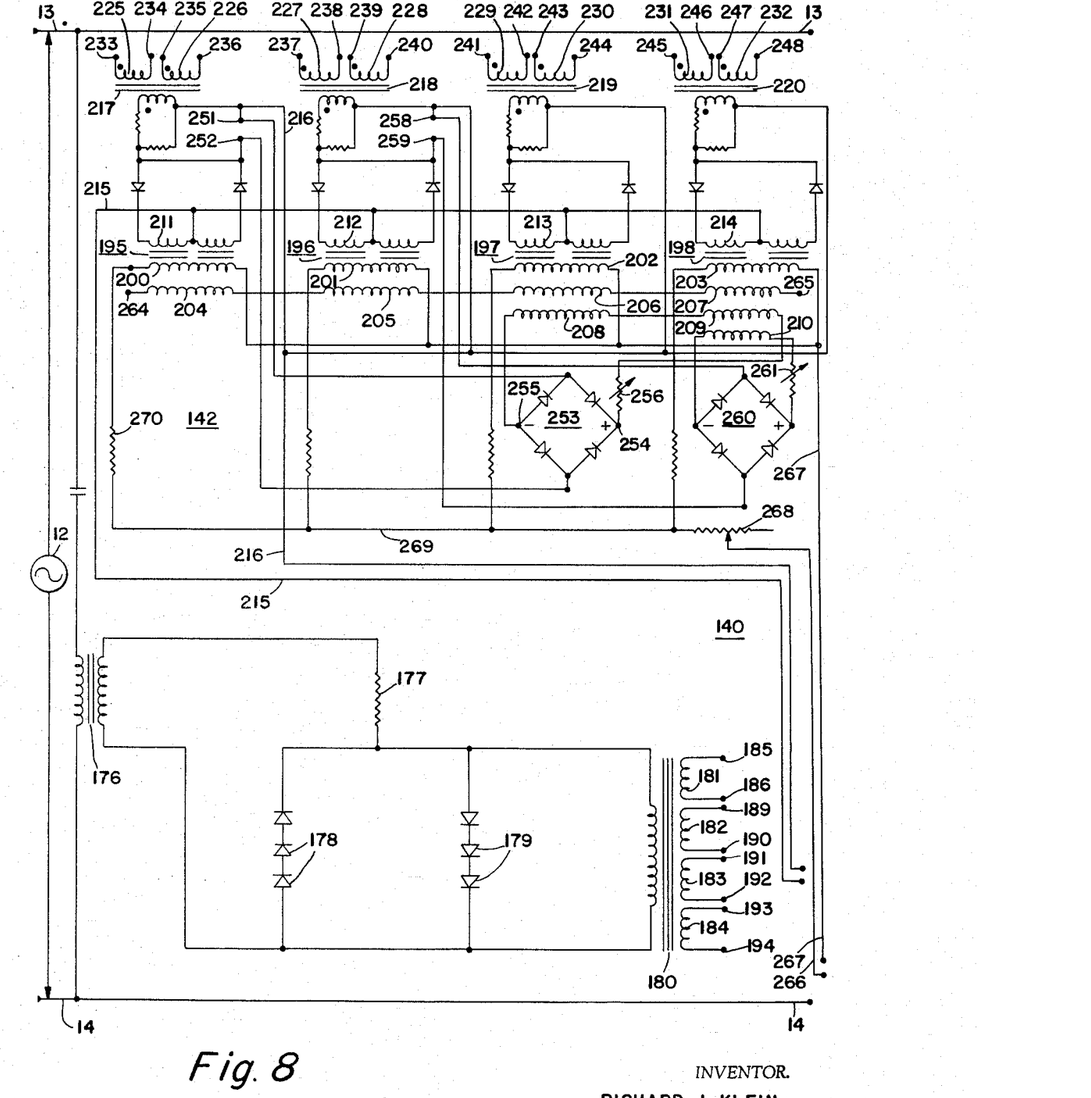
FIGURE 8 is a schematic diagram of a control circuit usable with the invention.
Figure 9:
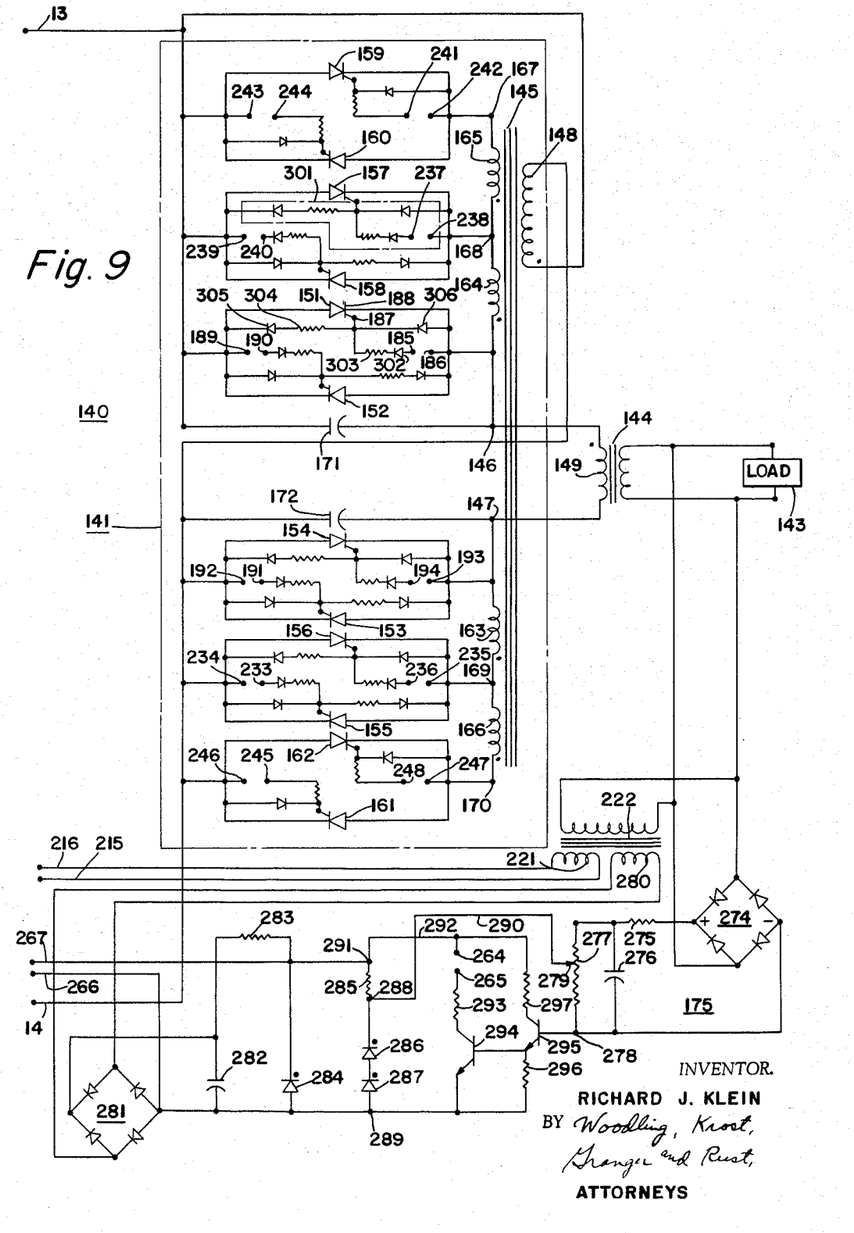
FIGURE 9 is a schematic diagram of a power portion of the regulator circuit and combined with FIGURE 8 forms a complete regulator circuit; and, FIGURE 10 is a schematic diagram of another power circuit which may be combined with FIGURE 8 to form a modified regulator circuit.

FIGURES 8 and 9 taken together show a complete regulator circuit 140 which is the preferred embodiment of the invention. This regulator circuit 140 includes generally a power circuit 141 shown in FIGURE 9 and a control circuit 142 shown in FIGURE 8. In this regulator circuit 140, a load 143 is supplied with energization from the A.C. source 12 on lines 13 and 14 through a transformer 144 and a transformer 145. The transformer 144 has a primary 149 with terminals 146 and 147 and the transformer 145 has a primary 148 connected across the lines 13 and 14. Twelve controlled rectifiers, numbered 151 through 162, respectively, are provided to selectively supply energization to the transformer 144 and through this transformer to the load 143. The transformer 145 has first, second, third and fourth secondary windings 163, 164, 165 and 166, respectively. Secondary 165 has an end terminal 167 plus a terminal 168 which is a junction with the secondary 164. The other end of this secondary 164 is connected to terminal 146 of the primary 149 of transformer 144. The other terminal 147 of this primary is connected to one end of the secondary 163 and the other end of the secondary 163 has a terminal 169 which is a junction with secondary 166. The other end of this secondary 166 has a terminal 170. The controlled rectifiers 151–162 may again be solid state controlled rectifiers such as silicon controlled rectifiers which may be fired by a proper positive signal on the gate relative to the cathode whenever the anode is positive relative to the cathode. Also, such silicon controlled rectifiers have the property of holding off conduction even though the anode is positive relative to the cathode as long as the gate is open or shorted or negative relative to the cathode. The first and second controlled rectifiers 151 and 152 are connected in opposition and in parallel between the input line 13 and the terminal 146. A protective capacitor 171 may also be connected between line 13 and terminal 146. The third and fourth controlled rectifiers 153 and 154 form an opposed pair connected in parallel between line 14 and terminal 147. Thus, it will be noticed that when rectifiers 151 and 153 are fired together on one half cycle the rectifiers 152 and 154 are fired together on the other half cycle, this energizes the transformer 144 directly from the input lines 13 and 14. A protective capacitor 172 may be connected between line 14 and terminal 147.

The next pair of controlled rectifiers 155 and 156 are connected in opposition and in parallel between line 14 and terminal 169. The fourth pair of controlled rectifiers 157 and 158 are connected in opposition and in parallel between line 13 and terminal 168. The fifth pair of controlled rectifiers 159 and 160 are connected in parallel and in opposition between line 13 and terminal 167. The sixth pair of controlled rectifiers 161 and 162 are connected in parallel and in opposition between line 14 and terminal 170. The primary 148 of transformer 145 is reversely connected across the input lines 13 and 14 so that whenever the upper line 13 is positive, the lower terminals of each of the four secondaries 163–166 will be positive relative to the upper terminals thereof. Thus, the various secondaries 163–166 supply a voltage which is in addition to or boosting the input voltage of the source 12 as supplied to the primary 149 of the main transformer 144.

The regulator circuit 140 is designed to turn on the first and second pairs of controlled rectifiers 151–154 essentially at the start of the respective positive and negative half cycles. This essentially places the input voltage 12 across the primary of transformer 144 to thus energize the load 143. The control circuit 142 includes a feedback circuit 175 so that as the load voltage tends to drop, the power circuit 141 is controlled to progressively switch on a higher numbered pair of controlled rectifiers 155–162 to thus progressively include in the input circuit additional voltages from the secondaries 163–166 to thus progressively attempt to raise the output voltage.

The control circuit 142 is primarily shown in FIGURE 8 for cooperation with the power circuit 140 shown primarily in FIGURE 9. A power supply transformer 176 is energized from the lines 13 and 14 and supplies power to a resistor 177 and a first series combination 178 of rectifiers. A second series combination of rectifiers 179 is connected in parallel and in opposition to the first rectifiers 178. Thus, the forward voltage drop of the rectifiers 178 may be about three volts on one half cycle and correspondingly there will be a three volt forward drop across the rectifiers 179 on the other half cycle. Thus, a square wave of voltage is applied to a gate transformer 180. This transformer 180 has four secondaries 181 to 184 to supply the gates of the first four controlled rectifiers 151 to 154. The first secondary 181 has terminals 185 and 186 connected respectively to the gate and cathode 187 and 188 of the first controlled rectifier 151. The secondary 182 has terminals 189 and 190 connected to the cathode and gate, respectively, of the second controlled rectifier 152. Secondary 183 has terminals 191 and 192 connected to the gate and cathode, respectively, of the third controlled rectifier 153. Secondary 184 has terminals 193 and 194 connected to the cathode and gate, respectively, of the fourth controlled rectifier 154. Thus, this gate transformer 180 which may be a saturable transformer, supplies firing signals to the gates of the first through fourth controlled rectifiers 151–154 to cause them to fire essentially at the start of the respective positive and negative half cycles.

The control circuit 142 in this case incorporates magnetic amplifiers to control the firing angle of the remaining four pairs of controlled rectifiers 155–162. First through fourth magnetic amplifiers 195–198 are connected to control these four pairs of controlled rectifiers and have bias windings 200–203, respectively. These magnetic amplifiers also have control windings 204–207, respectively. Magnetic amplifier 197 has a negative feedback winding 208. Magnetic amplifier 198 has two negative feedback windings 209 and 210. The magnetic amplifiers 195 through 198 have output windings 211 to 214, respectively. These output windings are center tapped with one energization terminal for an input to these magnetic amplifiers on a line 215 connected to such mid taps and another energization line 216 supplies energization to each of these energization windings 211–214 through primaries of pulse transformers 217 to 220, respectively. The energization lines 215 and 216 are supplied with alternating current from a suitable source and are shown as being supplied through the secondary 221 of a transformer 222 energized from the load 143. Since this is a regulated voltage supplied to the load 143, this makes a convenient source for energizing the magnetic amplifiers 195–198. As is well known, the various bias and control windings on the magnetic amplifiers supply a unidirectional current to control the point at which the flux collapses in the magnetic amplifiers and, thus, controls a variable phase angle at which a pulse is supplied to the pulse transformer 217–220.

The pulse transformer 217 has secondaries 225 and 226, pulse transformer 218 has secondaries 227 and 228, pulse transformer 219 has secondaries 229 and 230 and pulse transformer 220 has secondaries 231 and 232. The secondary 225 has terminals 233 and 234 connected to the gate and cathode, respectively, of the fifth controlled rectifier 155. Secondary 226 has terminals 235 and 236 connected to the cathode and gate, respectively, of the sixth controlled rectifier 156. Secondary 227 has terminals 237 and 238 connected to the gate and cathode, respectively, of the seventh controlled rectifier 157. Secondary 228 has terminals 239 and 240 connected to the cathode and gate, respectively of the eighth controlled rectifier 158. Secondary 229 has terminals 241 and 242 connected to the gate and cathode, respectively, of the ninth controlled rectifier 159. Secondary 230 has terminals 243 and 244 connected to the cathode and gate, respectively, of the tenth controlled rectifier 160. Secondary 231 has terminals 245 and 246 connected to the gate and cathode, respectively of the eleventh rectifier 161. Secondary 232 has terminals 247 and 248 connected to the cathode and gate, respectively, of the twelfth controlled rectifier 162.

The circuit of the first magnetic amplifier 195 has output terminals 251 and 252 which are connected to a bridge rectifier 253. Thus, a small A.C. voltage from the circuit of the first magnetic amplifier 195 is rectified by the rectifier 253 and appears across output terminals 254 and 255 thereof. This rectified output voltage is applied to the negative feedback windings 208 and 209 in series through a control rheostat 256. In a similar manner, the circuit of the second magnetic amplifier 196 has output terminals 258 and 259 supplying a small A.C. voltage to a second rectifier bridge 260. The rectified output of this bridge 260 is applied through a control rheostat 261 to the negative feedback winding 210.

The control windings 204–207 are connected in series between control terminals 264 and 265. These control terminals are energized from a unidirectional current source in the feedback circuit 175 shown in FIGURE 9. The bias windings are energized from lines 266 and 267. Line 266 is connected through a rheostat 268 to a line 269 and the bias windings 200–203 are connected in parallel between the lines 267 and 269. Each bias winding is in series with a limiting resistor, such as resistor 270.

The feedback circuit 175 controls the control circuit 142. This feedback circuit obtains a control signal in accordance with a load condition and, in this case, it is shown as obtaining a control signal in accordance with the load voltage. A bridge rectifier 274 is connected in parallel with the primary of transformer 222 across the terminals of the load 143. This bridge rectifier 274 supplies a rectified voltage which is filtered by resistor 275 and capacitor 276 and is applied to a feedback potentiometer 277. This potentiometer has a terminal 278 and a slider 279 which will have a positive voltage thereon relative to the terminal 278.

A reference voltage is obtained in any convenient manner and, as shown, the transformer 222 has a secondary 280 supplying a bridge rectifier 281 supplying a rectified voltage which is filtered by a capacitor 282 and then applied to the combination of a resistor 283 and a zener diode 284. Thus, a substantially constant voltage is developed across the zener diode 284. The voltage across the zener diode 284 is applied to the combination of a resistor 285 and two zener diodes 286 and 287. The junction terminal 288 between resistor 285 and 286 thus becomes a reference potential terminal relative to terminal 289 at the other end of the zener diodes 286 and 287, and terminal 289 is connected to the negative terminal of the bridge rectifier 281. A line 290 connects terminal 289 and the potentiometer slider 279. A terminal 291 is at the upper end of the resistor 285. A line 292 extends from this terminal 291 to the control terminal 264 and then from terminal 264 to 265 through the four series connected control windings 204–207, as shown in FIGURE 8. Terminal 265 is connected through a limiting resistor 293 and through the collector and emitter of an NPN transistor 294 to the terminal 289. The base of transistor 294 is connected to the emitter of an NPN transistor 295 which emitter is also connected through a load resistor 296 to the terminal 289. The collector of transistor 295 is connected through a limiting resistor 297 to the line 292. The base of the transistor 295 is connected to the terminal 278 of potentiometer 277.

*Operation of FIGURES 8 and 9*

The regulator circuit 140 of FIGURES 8 and 9 has found embodiment, as one example, in a 25 kva., 400-cycle, 440-volt input to 115-volt output A.C. regulator. It is designed to maintain the load voltage constant despite fluctuations in input voltage between 265 and 505 volts. As such, the primary 149 of transformer 144 is wound for the maximum voltage of 505 volts and, thus, has the transformation ratio of 505 to 115. Accordingly, if the line voltage at lines 13 and 14 is at this predetermined maximum of 505 volts, the control circuit 142 is designed to cause firing of the first, second, third and fourth controlled rectifiers 151–154 and, thus effectively, the lines 13 and 14 are directly connected to the primary of transformer 144. This firing of these four controlled rectifiers is effected essentially at the start of the respective positive and negative half cycles. This is accomplished by the gate transformer 180. A square wave of voltage is applied to the primary of this gate transformer 180 by the series combinations of diode rectifiers 178 and 179. Thus, a squared wave is supplied from the secondaries 181–184 of this gate transformer to the controlled rectifiers 151–154, respectively. The steeply rising wave front of these squared waves is synchronized with the source voltage and, hence, the controlled rectifiers 151 to 154 are triggered to fire essentially at the start of the respective positive and negative half cycles.

If the input voltage is 505 volts, then the load voltage will be at its correct value of 115 volts for low load conditions. If the input voltage decreases or the load current increases, this will cause the load voltage to decrease, thus the feedback voltage between potentiometer slider 279 and terminal 278 will decrease, Since slider 279 is connected to the reference voltage terminal 288, this means that an error signal will be developed between terminals 278 and 289. Terminal 278 will become more positive relative to terminal 289, thus turning on the transistor 295. This develops current through the load resistor 296 which applies a positive signal on the base of transistor 294. Both transistors 294 and 295 are of the NPN type and, thus this also turns on transistor 294. This causes the load current of the transistor 294 to flow through control terminals 264 and 265, thus, this increases the control current in the control windings 204–207 of the magnetic amplifiers 195 to 198. These control windings are poled in the opposite direction to the remainder of the unidirectional current windings on the magnetic amplifiers. This increased current in control winding 204 turns on the magnetic amplifier 195 so that pulses of current late in each respective half cycle appear in the secondaries 225 and 226. These pulses cause firing of the fifth and sixth controlled rectifiers 155 and 156 late in each respective half cycle. When the controlled rectifier 155 is fired, this places the secondary 163 in circuit to raise the voltage applied to the primary 149 of power transformer 144. Also, when controlled rectifier 155 fires, this essentially places a short circuit between terminal 169 and line 14 so that the potential of terminal 169, which is positive at that instant relative to terminal 147, is applied to the cathode of the third rectifier 153, thus extinguishing this controlled recifier. Similarly, on the negative half cycle, the pulse from the magnetic amplifier secondary 226 is applied to the sixth controlled rectifier 156 to fire it and this applies the negative potential of terminal 169 to the anode of the controlled rectifier 154 to extinguish this fourth rectifier 154.

The greater the error signal between the feedback terminal 278 and reference terminal 289, the greater will be the current supplied to the control winding 204. This will shift the phase of the firing point of the fifth and sixth controlled rectifiers 155 and 156 in an advancing direction to increase the effective R.M.S. voltage supplied to the load 143. In an actual case, the secondaries 163, 164 and 165 may have about 40 volts nominally for a 440-volt input and secondary 166 may have about 120 volts. Thus, if the 40 volts boost given to the primary of the power transformer 144 by alternate firing of the controlled rectifiers 155 and 156 is not sufficient, then the control circuit 142 will bring into operation the seventh and eighth controlled rectifiers 157 and 158. This is accomplished by the error signal at terminals 278 and 289 becoming large enough to supply sufficient control current to control winding 205 so that the second magnetic amplifier 196 becomes effective. The second magnetic amplifier 196 is biased off to a greater extent than the first magnetic amplifier 195 for this very purpose. This is accomplished by having one unit of bias on the bias winding 200 and two units of bias on each of the three bias windings 201, 202 and 203. This may be accomplished by the turns ratio in the bias windings or by the current supplied to the bias winding 200 through the limiting resistors 270. When the current in the control winding 201 of the second magnetic amplifier 196 overcomes the two units of bias in the bias winding 202, then pulses will begin to appear on the secondaries 227 and 228 of the pulse transformer 218. This fires the seventh and eighth controlled rectifiers 157 and 158 at some point in each half cycle. This places in the circuit the voltage of the secondary 164 to still further boost the voltage on the primary 149 of the power transformer 144 and, thus further increase the load voltage. Again, as the load voltage tends to further decrease, the feedback circuit 175 supplies an increasing error signal to further turn on the transistors 294 and 295, further increasing the current in the control windings 204 and 205. Because of only one unit of bias in the bias winding 200 of the first magnetic amplifier 195, the fifth and sixth controlled rectifiers 155 and 156 are turned full on. This occurs within a few degrees of the start of the respective positive and negative half cycles. Thus, though the third and fourth controlled rectifiers 153 and 154 will fire at the start of each half cycle, they are rapidly extinguished within a few degrees and the fifth and sixth controlled rectifiers 155 and 156 will then fire full on for the rest of the respective half cycle. The seventh and eighth controlled rectifiers 157 and 158 will fire partway through the respective half cycles and will extinguish the first and second controlled rectifiers 151 and 152 upon firing of the respective rectifiers 157 and 158.

Still further lowering of the input voltage or increase in load current to drop the load voltage again supplies an increased error signal. This will bring the third magnetic amplifier 197 into operation. This third magnetic amplifier has been held off by two units of bias on the bias winding 202 plus another unit of bias from the negative feedback winding 208. This additional unit of bias on the negative feedback winding 208 is supplied from the bridge rectifier 253 supplied from the output of the first magnetic amplifier 195. It is done in this manner rather than having three units of bias on the bias winding 202 in order to limit the total negative bias on the magnetic amplifier 197, otherwise the magnetic amplifier could turn on in the opposite direction. Thus, the third magnetic amplifier 197 gets only two units of bias on the bias winding 202 and does not get an additional unit of bias on the negative feedback winding 208 until the first magnetic amplifier 195 has been turned full on. At this time, the control winding 206 will have a forward bias to counteract the effect of the three units of negative bias supplied by bias winding 202 and negative feedback winding 208.

The tendency for the feedback signal to decrease still further will, thus, turn on the third magnetic amplifier 197. This supplies pulse signals on the pulse transformer secondaries 229 and 230 which fire the ninth and tenth controlled rectifiers 159 and 160. Firing of these rectifiers extinguish the seventh and eighth controlled rectifiers 157 and 158 and apply the voltage of secondary 165 in a boosting direction to the primary 149 of the power transformer 144. This may be an additional 40 volts boost in this example. Still further decrease in load voltage supplies additional error signal to increase the current in control winding 207 to render the fourth magnetic amplifier 198 effective. This magnetic amplifier has four units of bias with two units of bias supplied by bias winding 203 plus one unit each on negative feedback windings 209 and 210. The second negative feedback winding 210 is supplied from the bridge rectifier 260 in turn supplied from the output of the second magnetic amplifier circuit 196. Thus, the negative feedback winding 210 does not get its one unit of bias until the second magnetic amplifier 196 has come into full operation. When the fourth magnetic amplifier 198 is brought into operation by increased current in the control winding 208, pulses appear in the secondaries 231 and 232 of the pulse transformer 220. These pulses fire the eleventh and twelfth controlled rectifiers 161 and 162. Firing of these rectifiers extinguish the fifth and sixth controlled rectifiers 155 and 156 because of the voltage on the secondary 166. Also, this places in the circuit to the power transformer 144 the voltage of this secondary 166 which may be a high voltage, for example 120 volts. Again, decreasing load voltage controls the feedback circuit 175 to advance the firing point of the controlled rectifiers 161 and 162 to progressively increase the voltage to transformer 144 and hence to the load 143. In this final step, the ninth through twelfth controlled rectifiers 159–162 are firing to thus give the maximum voltage boost to transformer 144. This places in the circuit the voltages from all secondaries 163 to 166 to give a maximum of 240-volt boost, in the above example. By keeping the boost increments of voltage from secondaries 163 to 165 small, that is in the order of 8 to 10% of the nominal 440 volt input, the harmonic content of the output voltage may be kept exceptionally low. The total harmonic content may be kept below 5% for good regulator characteristics and the third harmonic content in the output voltage may be kept below 3%. Thus, for particular loads requiring low harmonic distortion in the output wave, this regulator circuit 140 has especial advantages. In normal use, the secondary 166 rarely comes into operation. Thus, only in extreme cases of exceptionally low input voltage would such secondary 166 come into the circuit. These might be considered emergency conditions and thus the secondary 166 has purposely been made of a larger nominal voltage to give a larger boost on this last step under such emergency conditions wherein the increased harmonic distortion can be tolerated.

The controlled rectifiers 151–162 have protective circuits 301. One such protective circuit will be described for the first controlled rectifier 151. A diode 302 and resistor 303 are connected in series to conduct current from terminal 185 to the gate 187 of the rectifier 151. Also, a resistor 304 and diode 305 are connected to conduct current from the gate 187 to the line 13. Additionally, a diode 306 is connected to conduct current from terminal 146 to the gate 187. This protective circuit 301 prevents false signals on the gate 187. It will be noted in the above description of the firing circuit that the first controlled rectifier 151 fires essentially at the start of the positive half cycle. Later, in this half cycle the seventh controlled rectifier 157 may be triggered to fire. At this firing, an inverse voltage is placed on the first controlled rectifier 151 from the secondary 164. Thus, there is an inverse voltage on rectifier 151 while there still exists a positive signal on the gate 187 from the gate transformer 180. The protective circuit 301 limits the amount of this positive signal under these conditions. The voltage from the secondary 164 puts current through the gate signal source terminals 186 and 185, through the diode 302, resistors 303 and 304, diode 305 and the controlled rectifier 157 to establish a voltage drop across the diode 302 and resistor 303 designed to be equal and opposite to the signal voltage on terminals 185 and 186. This gives a zero voltage on the gate to cathode of the first controlled rectifier 151. Transiently, the voltage on the secondary 164 may exceed the nominal 40 volts, in the example above, and if so, the current through the aforementioned loop would increase and this would establish a reverse bias of negative on the gate 187 of the controlled rectifier 151. However, the diode 306 prevents this by clamping or limiting the voltage on the gate 187 to the forward voltage drop of this diode 306 which is about one-half volt.

Figure 10:
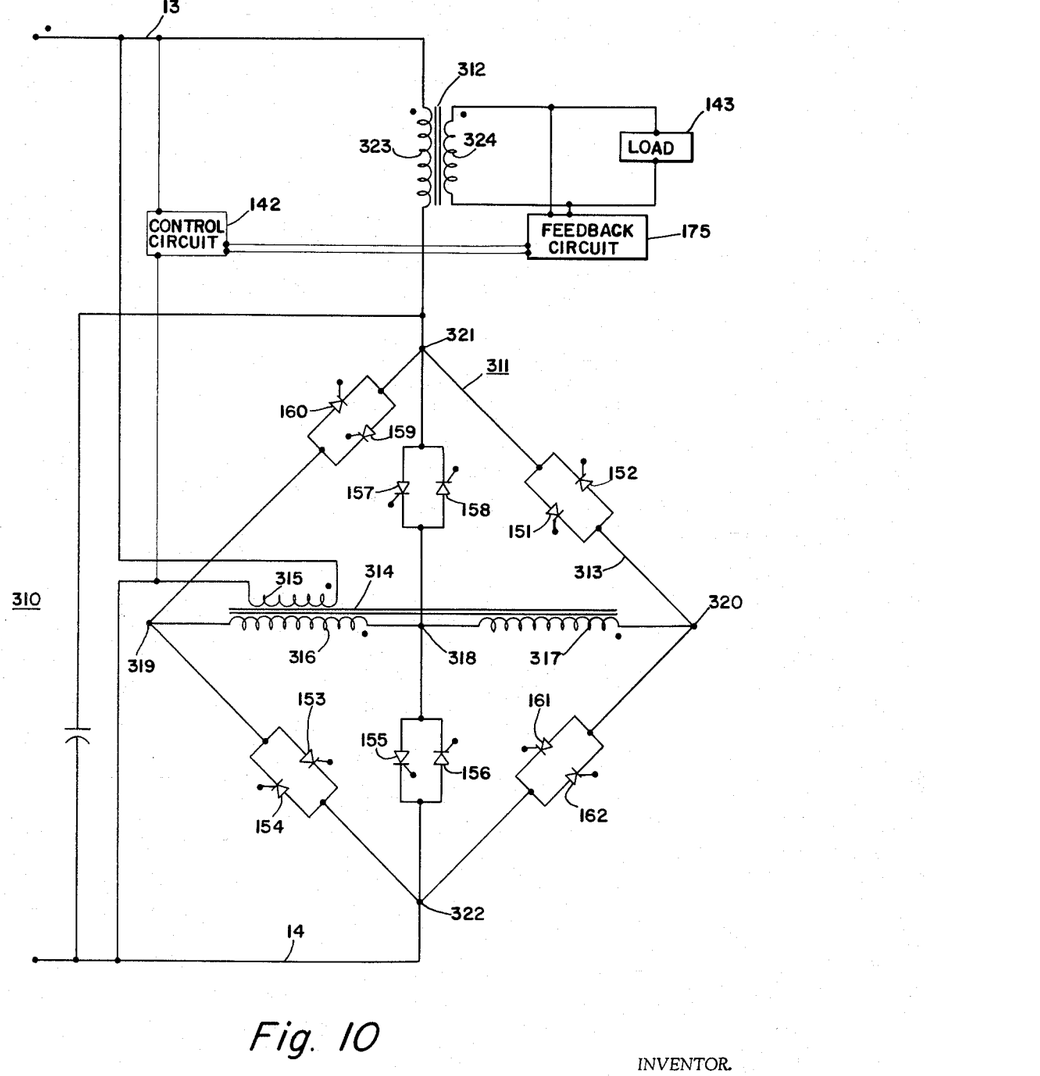

FIGURE 10 shows a power circuit 311 which may be used as an alternative to the power circuit 141 shown in FIGURE 9 and thus this power circuit 311 may be combined with the control circuit 142 and the feedback circuit 175 to provide a regulator circuit 310. The power circuit 311 includes a power transformer 312 supplying the load 143. Again, the load 143 would have feedback voltage connections to the feedback circuit 175. The power circuit 311 is arranged as a form of a bridge circuit 313. A transformer 314 supplies the bridge circuit 313 and has a primary 315 connected across the A.C. input lines 13 and 14. Secondaries 316 and 317 on the transformer 314 are connected together at a terminal 318 and have end terminals 319 and 320. Terminals 319 and 320 may be considered the A.C. input terminals of the bridge 313 and terminals 321 and 322 may be considered the A.C. output terminals of this bridge. The first through twelfth controlled rectifiers 151–162 are connected in the bridge circuit 313. The first pair of rectifiers 151 and 152 are connected between terminals 321 and 320. The second pair of controlled rectifiers 153 and 154 are connected between terminals 319 and 322. The third pair of controlled rectifiers 155 and 156 are connected between terminals 318 and 322. The fourth pair of controlled rectifiers 157 and 158 are connected between terminals 321 and 318. The fifth pair of controlled rectifiers 159 and 160 are connected between terminals 321 and 319 and the sixth pair of controlled rectifiers 161 and 162 are connected between terminals 320 and 322. The power transformer 312 has a primary 323 which has a transformation ratio relative to the secondary 324 thereof which may be 425 to 115 in accordance with the example set forth above for the regulator circuit 140. Also, the secondaries 316 and 317 of transformer 314 each have a nominal 40 volt rating.

*Operation of FIGURE 10*

The regulator circuit 310 is designed as either a bucking or boosting system, depending upon whether the voltage of the transformer secondaries 316 and 317 bucks or boosts the line voltage as applied to the primary 323 of the power transformer 312. With high line voltages, for example 505 volts, the regulator circuit 310 is conditioned to conduct only through the first to fourth controlled rectifier devices 151 to 154. This is again effected essentially at the start of the respective positive and negative half cycles. In this condition, the 80 volts total of the two secondaries 316 and 317 is subtracted from the line voltage of 505 volts to apply 425 volts to the transformer primary 323 and thus the transformation ratio of 425 to 115 will supply the correct voltage to the load 143. For slightly lower line voltages, this tends to lower the load voltage and the feedback circuit 175 controls the control circuit 142 to cause firing of the fifth and sixth controlled rectifiers 155 and 156. During the instant that line 13 is positive, controlled rectifier 155 will be triggered to fire and upon firing, this places the positive voltage of terminal 318 on the cathode of the controlled rectifier 153 to extinguish same. Thus, the voltage of the secondary 316 is used to extinguish this previously conducting rectifier 153 in the same manner as in the regulator circuit 140 of FIGURES 8 and 9. Also, the voltage of the secondary 316 is selectively cut out of the circuit and thus the voltage to the primary 323 of the power transformer 312 is raised to increase the load voltage.

The controlled rectifiers 151 to 162 have been connected in the bridge circuit 313 in such a manner that the explanation for the operation of the power circuit 141 of FIGURE 9 also applies to the operation of the power circuit 311 of FIGURE 10. Thus, with decreasing line voltages or decreasing load voltages, a signal is progressively supplied by the feedback circuit 175 to progressively turn on the seventh and eighth controlled rectifiers 157 and 158 which extinguishes the first and second controlled rectifiers 151 and 152. This cuts out both secondaries 316 and 317 from the circuit. Next, the ninth and tenth controlled rectifiers 159 and 160 come into operation and extinguish the seventh and eighth controlled rectifiers 157 and 158. This places the secondary winding 316 in circuit in a boosting direction to boost the voltage applied to the primary 323 by the amount of the voltage on the secondary 316. Next, the eleventh and twelfth rectifiers 161 and 162 come into operation and upon firing extinguish the fifth and sixth rectifiers 155 and 156. This places both secondaries 316 and 317 in circuit boosting the voltage to the transformer primary 323 by the total voltage of the two secondaries 316 and 317.

The circuits of FIGURES 8 and 9 and FIGURES 8 and 10 make use of the fundamental principle set forth in FIGURE 1, namely, of electronic tap changing and especially an infinite control between two of these taps or different voltages. These regulator circuits 140 and 310 additionally show refinement in control by providing four different steps of voltage with infinite control from the first to the last step.

The various regulator circuits shown above show that controlled rectifiers such as the controlled rectifiers 21 to 24 are used to connect a load to first and second different voltages, no matter whether the rectifiers are on the input or output of any transformer used. Thus, an alternating current voltage is supplied to the load in either of first or second different voltages and, additionally, there is an infinite range of effective R.M.S. voltages supplied to the load between these first and second voltages. Still further, the various regulator circuits described above show that two of the controlled rectifiers such as rectifier 21 and 22 of FIGURE 7 may be used to connect a load to first and second different alternating voltages. The first voltage in FIGURE 7 is that appearing between lines 13 and 14 when the controlled rectifiers 21 and 22 are conducting and, hence, are effectively a short circuit. The second voltage is that appearing across terminals 128 and line 14 when the zener diodes 131 and 132 are in the circuit and thus present a voltage drop. The zener diodes are thus a form of impedance means establishing a voltage drop. These first and second voltages are different substantially by the voltage drop across the zener diodes 131 and 132 and these first and second voltages are controlled in their application to the load, via the transformer 127, by the controlled conduction of the two controlled rectifiers 21 and 22.

Also, it will be noted in the various regulator circuits described above that two controlled rectifiers such as rectifiers 21 and 23 of FIGURE 3 control the connection of the load to two different voltages. The first voltage is the voltage between terminal 87 and line 14 when conduction is through the first controlled rectifier 21. The second voltage is the voltage between terminal 86 and line 14 when conduction is through the controlled rectifier 23. These are two different voltages and, hence, two different voltages are selectively applied to the load 81. Still further, it will be noted in the description of the above circuits that one controlled rectifier such as the controlled rectifier 21 in FIGURE 7 controls application of first and second voltages to the load 126. The first voltage is between lines 13 and 14 when the controlled rectifier 21 is conducting and the second voltage is between terminal 128 and line 14 when the controlled rectifier 21 is not conducting and the zener diodes 131 and 132 are in the circuit and present a voltage drop.

The control circuit 142 of FIGURE 8 shows how three different firing signals may be obtained at the gate transformer secondary 181, the pulse transformer secondary 225 and the pulse transformer secondary 227. The gate transformer secondary 181 supplies a firing signal to fire the first controlled rectifier 151 essentially at the start of the positive half cycle. The pulse transformer secondary 225 is biased off at the magnetic amplifier 195 to not come into operation until the current in the control winding 204 has reached a desired level. Further, the magnetic amplifier 196 is biased off still more so that the firing signal does not appear at the pulse transformer secondary 227 until still later when a still greater input to the power transformer 144 is desired. Thus, the control circuit for the pulse transformer secondaries 225, 226, 227 and 228 may be used in the circuits of FIGURES 5 and 7 to hold off firing of the controlled rectifiers 21 to 24 until after initial energization of the load takes place through the zener diodes 107 to 110 in FIGURE 5 or zener diodes 131 and 132 in FIGURE 7.

It will be observed that the regulator circuits described above have inherently good power factor because of absence of any inductive reactance in series with the load such as in magnetic amplifier type regulators. Also, the regulator circuits of the invention operate satisfactorily with loads of widely differing power factors either leading or lagging, which is again aided by the lack of any inductive reactance in series with the load in the regulator circuits. The efficiency of the regulator circuits is quite high, being in the order of 90 to 95% on large sizes and this is due to the inherently low voltage drops of the controlled rectifiers 151–162. The wave form of the output voltage is exceptionally good, being less than 5% of all harmonics for the regulator circuit and being only about 2.2% for the third harmonic. This harmonic content can be still further reduced by using additional steps of smaller voltage increments. The response time of the regulator circuits, for example regulator circuit 140 of FIGURES 8 and 9, is quite good, being in the order of only about 6 to 8 cycles for the full range of input voltage from 265 to 505 volts. This fast response time is due primarily to lack of any inductive reactance in series with the load. The regulator circuit 140 is quite small, compact and light, since the solid state controlled rectifiers 151–162 are small for their current carrying capacity. Also, the control circuit need only have in the order of 500 watts capacity for 25 kva. of load. Thus, this control circuit 142 is quite small for the power capacity of the regulator circuit 140.

Due in large measure to the lack of reactances in the circuit to the load, the regulator circuits of the present invention are not frequency sensitive, and thus may be used on differing frequencies.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A regulator for operation of a load from alternating voltage source means comprising, in combination,
   voltage dropping threshhold means,
   first and second pairs of opposedly connected solid state controlled rectifiers,
   means connecting said voltage dropping threshhold means between the source means and the load to apply a first voltage to the load,
   means connecting said first pair of controlled rectifiers between the source means and the load to apply a second voltage to the load of a different magnitude from said first voltage,
   means connecting said second pair of controlled rectifiers between the source means and the load to apply a third voltage to the load of a different magnitude from said first and second voltages,
   means for establishing energization of said load from said first voltage and essentially at the start of the respective positive and negative half cycles of said first voltage,
   and control circuit means to establish conduction of said first and second pairs of rectifiers partway through each respective positive and negative half cycle.

2. An A.C. circuit for use with an alternating voltage source comprising, in combination,
voltage dropping threshhold means,
first means connecting said voltage dropping threshhold means between the source and a load to apply a first voltage to the load,
first and second oppositely connected controllable rectifiers,
second means connecting said rectifiers between the source and the load to apply a second voltage of a different magnitude to the load,
means to cause conduction through said first means for energization of the load from the first voltage,
and means to shift the conduction from said first means to said second means at a variable phase angle in each respective half cycle to effectively connect said load to different values of voltage to change the voltage applied to said load.

3. A regulator for operation of a load from alternating voltage source means comprising, in combination, means including
voltage dropping threshhold means connected between the source means and a load to apply a first voltage thereto,
means including first and second pairs of oppositely connected controlled rectifiers for applying to the load second and third voltages, respectively, from said voltage source means each of different magnitudes from said first voltage,
means to cause conduction through said voltage dropping threshhold means essentially at the start of one half cycle of said first voltage,
control circuit means for establishing conduction of said first pair of rectifiers prior to conduction of said second pair of rectifiers,
and means to control said control circuit means to selectively establish conduction of said second pair of rectifiers partway through each respective positive and negative half cycle.

4. A regulator for operation of a load from an alternating voltage source comprising, in combination, means including zener diode impedance means for deriving a first voltage from said voltage source,
means including second zener diode impedance means for deriving a second voltage from said voltage source of different magnitude from said first voltage,
means for deriving a third voltage from said voltage source of different magnitude from said first and second voltages,
first and second pairs of oppositely connected controlled rectifiers,
means to connect said first voltage to said source and to a load,
means including said first pair of rectifiers to connect said second voltage to said source and to a load,
means including said second pair of rectifiers to connect said third voltage to said source and to said load,
control circuit means for establishing conduction of said first pair of rectifiers prior to conduction of said second pair of rectifiers,
and means to control said control circuit means to establish conduction of said second pair of rectifiers partway through each respective positive and negative half cycle.

5. A regulator for operation of a load from an alternating voltage source comprising, in combination, means including zener diode impedance means for deriving a first voltage from said voltage source,
means for deriving second and third voltages from said voltage source of different magnitudes from said first voltage,
a constant voltage transformer,
first and second pairs of oppositely connected controlled rectifiers,
means including said transformer to connect said first voltage to said source and to a load,
means including said transformer and said first pair of rectifiers to connect said second voltage to said source and to a load,
means including said transformer and said second pair of rectifiers to connect said third voltage to said source and to said load,
and control circuit means for establishing conduction of said first pair of rectifiers prior to conduction of said second pair of rectifiers and to establish conduction of said second pair of rectifiers partway through each respective positive and negative half cycle.

6. An A.C. voltage regulator for regulating the voltage applied to an A.C. load from an A.C. source, comprising in combination, means including a first transformer having terminals for establishing first, second and third different voltages dependent upon voltage of an A.C. source,
first, second, third and fourth pairs of oppositely connected silicon controlled rectifiers,
each pair being connected between the source and a terminal of one of said first, second and third voltages,
said first, second and third voltages being of different magnitude with said first voltage being the largest,
control means for establishing alternative conduction of the control rectifiers in said first pair and in said second pair for alternate half cycles of said A.C. source essentially at the start of the respective half cycle,
feedback means connected to said output circuit to obtain a voltage dependent on the voltage of said load,
control circuit means for said third and fourth pairs of controlled rectifiers and including first and second magnetic amplifiers respectively,
each of said magnetic amplifiers including a bias winding and a control winding,
said first magnetic amplifier having one unit of bias on the bias winding thereof,
said second magnetic amplifier having two units of bias on the bias winding thereof,
means connecting said feedback means to said control windings of said magnetic amplifiers whereby if the output voltage is less than a predetermined value, said feedback means supplies an error signal and consequent current to said control windings to turn on said first magnetic amplifier to establish conduction of said third oppositely connected pair of controlled rectifiers in the range between zero and 180 degrees of each half cycle of the A.C. source to thus establish a higher average amplitude of alternating current supplied to said output,
and whereby if said output voltage is still too low said feedback means supplies an error signal to said control windings to turn on said second magnetic amplifier to cause conduction of said controlled rectifiers in said fourth oppositely connected pair of controlled rectifiers to thus establish a still higher average amplitude of alternating current supplied to said load,
the difference between said first and second voltages being applied to said second pair of rectifiers in a reverse polarity sense upon initial firing of said third pair of rectifiers to extinguish conduction through said second pair of rectifiers,
and the difference between said second and third voltages being applied to said third pair of controlled rectifiers in a reverse polarity sense upon initial firing of said fourth pair of rectifiers to extinguish conduction through said third pair of rectifiers.

7. A regulator as claimed in claim 6, wherein said first, second and third voltages are established by said first and a second transformer, said second transformer including first and second windings selectively connected by said controlled rectifiers to opposite ends of said first transformer.

8. A regulator as claimed in claim 6, wherein said first, second and third voltages are established by said first and a second transformer, and means connecting said controlled rectifiers in a bridge circuit to said second transformer.

9. A regulator for operation of a load from alternating voltage source means, comprising, in combination,
voltage dropping threshold means,
a controlled rectifier,
means connecting said voltage dropping threshold means between the source means and a load to apply a first voltage to the load,
means connecting said controlled rectifier between the source means and the load to apply a second voltage to the load of a different magnitude,
means for establishing conduction through said voltage dropping threshold means for energization of the load from said first voltage essentially at the start of one half cycle of said first voltage,
and control circuit means to establish conduction of said controlled rectifier part way through said one cycle.

References Cited by the Examiner
UNITED STATES PATENTS 3,040,239  6/1962  Walker ___________ 323—43.5

JOHN F. COUCH, *Primary Examiner.*

LLOYD McCOLLUM, *Examiner.*

K. W. HADLAND, K. D. MOORE, *Assistant Examiner.*